United States Patent [19]

Kamigaichi et al.

[11] Patent Number: 4,607,925

[45] Date of Patent: Aug. 26, 1986

[54] IN-PIPE INSPECTION SYSTEM

[75] Inventors: Hideyuki Kamigaichi, Yokohama; Kazuto Kurachi, Chigasaki; Nobuyoshi Asano; Tatsuo Hanada, both of Yokohama, all of Japan

[73] Assignee: Adek Corporation, Tokyo, Japan

[21] Appl. No.: 687,095

[22] Filed: Dec. 28, 1984

[30] Foreign Application Priority Data

Dec. 28, 1983 [JP] Japan ............................. 58-248292

[51] Int. Cl.[4] ..................... G03B 37/00; H04N 7/18
[52] U.S. Cl. ................................... 354/63; 346/33 P; 358/100
[58] Field of Search .......... 354/63; 346/33 P, 33 WL, 346/107 W; 358/100, 106–108

[56] References Cited

U.S. PATENT DOCUMENTS

| | | | |
|---|---|---|---|
| 2,953,979 | 9/1960 | Rosene et al. | 354/62 |
| 3,270,641 | 9/1966 | Gosselin | 354/63 X |
| 3,832,724 | 8/1974 | Duval | 354/63 |
| 4,063,283 | 12/1977 | Rider et al. | 354/63 X |
| 4,249,810 | 2/1981 | O'Connor et al. | 354/63 |

Primary Examiner—William B. Perkey
Attorney, Agent, or Firm—Browdy and Neimark

[57] ABSTRACT

An in-pipe inspection system comprising a train of cars made up of at least a camera car, a drive car, the train being made to travel in a pipe laid underground, under water or on the ground; a cable connected to the train of cars, the cable being led out from one open end of the pipe and being adapted to be fed or retracted by a capstan as the train of cars travels in selected directions within the pipe; and equipment installed outside the pipe consisting of a control unit, a measuring device, etc., the equipment being connected with the end of the cable; whereby the train of cars is made to travel in the pipe so that pictures of flaws, wear or corrosion in the internal wall of the pipe can be taken by the camera car, and correllative inspection data transmitted through the cable to the equipment for detailed analysis, and whereby movement of the train of cars, and inspection functions performed by such cars as the camera car, are remotely controlled, through the cable, from the outside equipment.

3 Claims, 3 Drawing Figures

IN-PIPE INSPECTION SYSTEM

BACKGROUND OF THE INVENTION

The present invention relates to an in-pipe inspection system to inspect the condition of the internal surface of pipes that transport liquid, gases, or fluid material to see if there is any corrosion, wear or breaks in the pipe.

SUMMARY OF THE INVENTION

It is therefore an object of this invention to provide a novel in-pipe inspection system which facilitates accurate inspection of the interior of very long pipes (on the order of several kilometers).

This object is attained through the provision of an in-pipe inspection system comprising a train of cars including a camera car and a drive car. The pipe may be of the type which is positioned on the ground, underground or under water, and which includes at least one open end. The train is adapted for travel in the pipe and includes a cable connected between the respective cars of the train, and equipment installed outside the pipe, including control means for controlling various functions of the train of cars. Capstan means are provided outside the pipe, and between the train of cars and the outside equipment, to feed or retract the cable through the open end.

BRIEF DESCRIPTION OF THE DRAWINGS

Further objects and advantages will become apparent from the following description of a preferred embodiment when taken into consideration with the accompanying drawings, in which.

DETAILED DESCRIPTION OF THE PREFERRED EMBODIMENT

Figure 1:
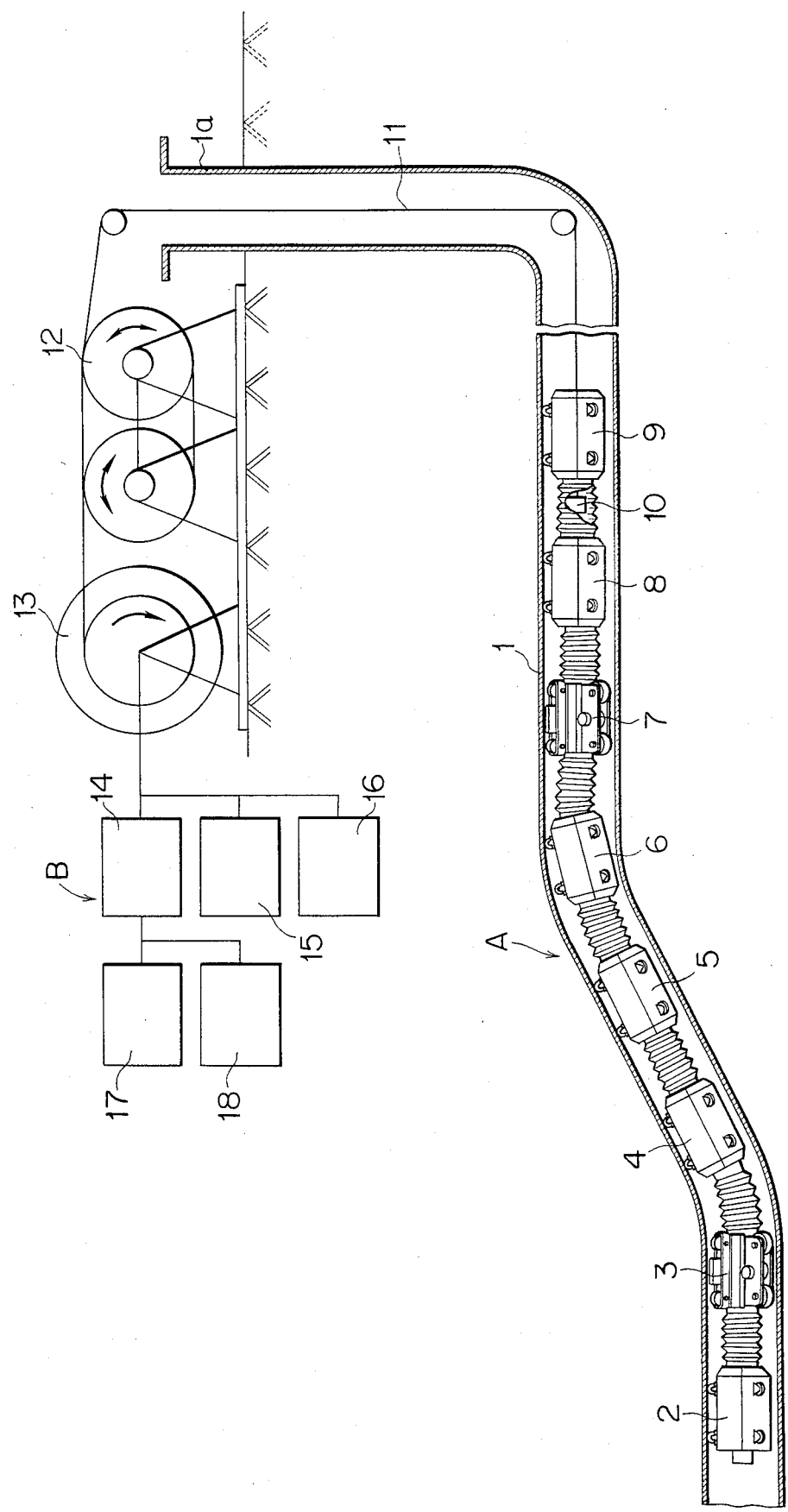
FIG. 1 is a schematic representation of, the inpipe inspection system of this invention.

Referring to FIG. 1, there is shown a pipe member 1, such as a petroleum pipeline several kilometers in length, buried underground and having its base end 1a open above the ground. Located within the pipe is a train of cars A including a camera car 2, a first drive car 3, a solenoid valve car 4, a hydraulic pump car 5, an oil tank car 6, a second drive car 7, a multiplex communication equipment car 8 and a slip ring car 9.

The camera car 2 constitutes a main part of this system and performs inspection functions inside the pipe 1. This is accomplished with laser equipment, carried by the camera car, which generates laser beams that are radiated against the internal wall of the pipe 1. If there is any flaw or defect in the internal pipe surface, the uneven surface of the flaw produces a corresponding discontinuity in the beams which are received by a TV camera and then transmitted through a cable (described later) to the ground station where the presence and degree of the discontinuity in the laser beams are identified. The exposure of the camera is regulated by an automatic lens opening system with its zoom and focus being remotely controlled. The lighting and power supply for the camera is also remotely controlled.

The distance the camera car 2 has traveled is calculated from then number of rotations of a metering wheel which does not slip over the pipe internal surface. The number of rotations of the wheel is converted into pulses which are transmitted to the ground station to calculate the traveled distance.

Figure 2:
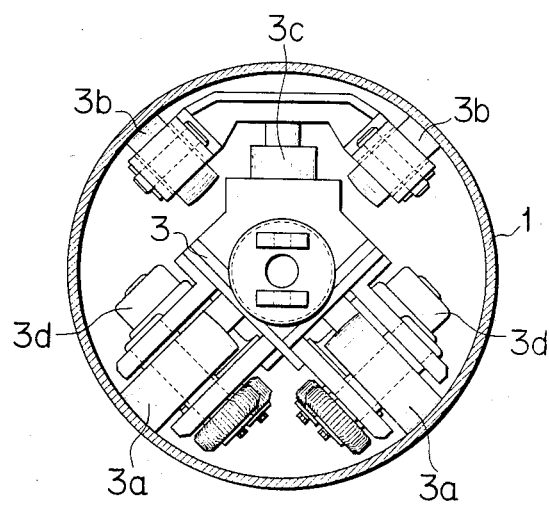
FIG. 2 is a front view of a drive car employed in the train of cars.

The first drive car 3 drives the train of cars A. As shown in FIG. 2, the drive car comprises drive wheels 3a, and push wheels 3b oriented in the opposite directions. The push wheels 3b are strongly pressed by the hydraulic cylinder 3c against the pipe internal wall to increase the contact pressure of the drive wheels 3a with the pipe wall and thereby increase the traction force of the drive wheels 3a driven by the hydraulic motors 3d. Each hydraulic motor 3d exhibits high torque during low rotation speed. It is desirable that the drive wheels 3a be formed of such material as aluminum so as not to damage the pipe internal wall and that the push wheels 3b be formed of synthetic resin such as polyurethane. The connections between the first drive car 3 and the cars located before and after the first drive car are freely rotatable so that any inclination of the attitude of the drive car as it travels will not adversely affect the other cars.

The solenoid valve car 4 carries various solenoid valves that control valves in the hydraulic system for the drive cars 3, 7 such as pressure charge and discharge valves for the hydraulic cylinder 3c, bypass and direction flow control valves for the hydraulic motor 3d, and a hydraulic pump unload valve (described later). Thus, by remotely controlling the direction flow control valve continuously, the speed of the hydraulic motor 3d can be changed continuously without step to control the speed of the drive cars 3, 7. Also mounted on this solenoid valve car 4 are a safety valve, a brake mechanism setting pressure-reducing valve, etc.

The hydraulic pump car 5 generates oil pressure required for the drive cars 3, 7 and carries a 3-phase electric motor, a phase advance capacitor and a starting switch as well as a hydraulic pump unit. The hydraulic pump unit is able to vary the delivery pressure to adjust the power burden. The phase advance capacitor is employed to improve the power factor of the electric motor and reduce heat generated in the cable.

The oil tank car 6 carries oil for the hydraulic system and has a temperature switch to monitor temperature rise in the system and also a cooling tube to prevent excess temperature rise. The oil tank is of hermetic structure to prevent oil leakage which may otherwise be caused by a the traveling attitude. The oil tank is also constructed to minimize internal pressure increase due to a rise in the oil temperature.

The second drive car 7 has almost the same construction and capability as the first drive car 3 and the two drive cars cooperate in driving the train of cars A.

The multiplex communication equipment car 8 is assigned the function of communicating with the ground station. Car 8 receives signals from the ground station and issues commands to control the camera car 2 and the drive cars 3, 7; it also sends to the ground station information on a load cell 10 provided between it and the slip ring car 9 (described later), as well as information on the receiving voltage, temperature switch and pressure switch.

The slip ring car 9 contains a convertor to convert the light signals sent through the optical fiber into electric signals and another convertor to change the electric signals into light signals and transmit them through the optical fiber.

Figure 3:
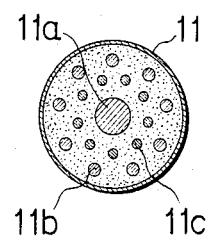
FIG. 3 is an enlarged cross section of the cable.

A cable 11, which may be several kilometers long, is provided through which power and signals of this system are transmitted. The cable 11 is composed, as shown in FIG. 3, of a tension member 11a with small elongation and distortion rate, located at the center, and power lines 11b and optical fibers 11c disposed around the tension member 11a.

At the ground station, there are provided a double capstan 12 to feed or retract the cable 11, and a cable drum 13 to wind the cable. The double capstan 12 is made up of two spiral-grooved wheels whose rotating direction and speed are automatically controlled by signals from the load cell 10 and signals representing the looseness of the cable 11 at the outlet of the capstan 12. The maximum tension for retracting is present to prevent the breakage of cable 11 due to excessive tension.

The cable drum 13 follows the motion of capstan 12 during the cable feeding and retraction, and is sprayed with water and immersed in a water tank to prevent temperature rise in the cable 11. When the water in the tank rises in temperature, cool water is supplied into the tank.

The optical fibers 11c extending from the end of the cable 11 wound on the cable drum 13 are connected to the signal lines through a light-electricity convertor. The power lines 11b and signal lines are led through the slip ring and connected to equipment B outside the pipe. The equipment includes a control unit 14 and a measuring device 15. The control unit 14 performs various controls such as turning on and off of the power supply for the camera mounted on the camera car 2, forward rotation and reversing, inching, zooming and adjusting of focus of the camera, and turning on and off of the lamp and laser, on-off operation of various valves mounted on the solenoid valve car 4, and forward and backward driving and stopping of the drive cars 3, 7. The measuring device 15 measures, based on the television signals, the depth of fault or corrosion in the internal wall of the pipe 1. This measurement can be accomplished by watching the screen of monitor TV 16 and manually operating a cursor. In addition, the measuring device 15 performs correction of the distance traveled by the cars in the pipe, counting, detection of camera attitude, detection of zoom ratio, water content correction, and addition and substraction operations of the number of beads; the result of these are displayed on the TV monitor 16 at any time.

A video tape recorder (VTR) 17 records the display on the TV monitor 16. A power source 18 supplies the control panel, measuring device, TV monitor, VTR and the group of cars. The power source regulates to a constant value the voltage of the receiving end of the train of cars according to variations in the load of the traveling cars.

Various advantages are realized through this invention, but only the most significant are summarized below:

(1) Since each of the cars of the train is assigned its particular function, they can be structured in a compact and simple manner, thus eliminating the possibility of failure while the train of cars is travelling in the pipe;

(2) Since powerful drive cars are incorporated into the train of cars, the train can reliably and smoothly travel in a long pipe that extends several kilometers;

(3) Since the inspection data and visual signals collected inside the pipe are transmitted through a long cable to the equipment at the ground station, measurement, data processing, observation and recording can all be performed freely without restriction. It is also possible to control the train of cars in the pipe from the ground station quickly and reliably. In this way inspection and observation inside the long pipe can be accomplished without the need for personnel to enter the pipe.

What is claimed is:

1. An in-pipe inspection system comprising:
   a train of cars including a camera car, a drive car, a solenoid valve car, a hydraulic pump car, an oil tank car and a slip ring car, said train being adapted to travel in a pipe laid on the ground, underground or under water, and having at least one open end;
   said drive car including drive wheels driven by a hydraulic motor and push wheels pressed by a hydraulic cylinder against the internal wall of the pipe;
   said solenoid valve car carrying solenoid valves for controlling said hydraulic motor and hydraulic cylinder;
   said hydraulic pump car carrying a hydraulic pump for the hydraulic motor and hydraulic cylinder;
   said slip ring car being located at the end of said train;
   a cable connected to said slip ring car and composed of a centrally disposed tension member, and power lines and optical fiber means surrounding said tension member;
   outside equipment installed outside the pipe including control means for controlling said train of cars, said outside equipment being coupled with said cable; and
   means provided outside the pipe and between said train of cars and said outside equipment, for selectively feeding or retracting said cable through said pipe open end.

2. An in-pipe inspection system according to claim 1, wherein said control means includes a control unit, and a measuring device.

3. The in-pipe inspection system of claim 1 wherein said outside equipment includes a video monitoring system, and said cable means comprises means for electronically coupling said video monitoring system with said information signal sending means.

* * * * *